United States Patent [19]

Saito et al.

[11] Patent Number: 4,752,783

[45] Date of Patent: Jun. 21, 1988

[54] THERMAL-ELECTROSTATIC INK JET RECORDING METHOD AND APPARATUS

[75] Inventors: Koichi Saito; Yoshihiko Fujimura; Nanao Inoue, all of Kanagawa, Japan

[73] Assignee: Fuji Xerox Co., Ltd., Kanagawa, Japan

[21] Appl. No.: 30,438

[22] Filed: Mar. 26, 1987

[30] Foreign Application Priority Data

Mar. 27, 1986 [JP] Japan .................................. 61-67301

Mar. 27, 1986 [JP] Japan .................................. 61-67302

[51] Int. Cl.[4] ................................................ G01D 9/00

[52] U.S. Cl. ........................................ 346/1.1; 346/75; 346/140 R; 400/126

[58] Field of Search ....................... 346/75, 1.1, 140 R, 346/140 PD, 153.1, 155, 159; 400/126

[56] References Cited

U.S. PATENT DOCUMENTS 3,790,703 2/1976 Carley .................................. 346/1.1

FOREIGN PATENT DOCUMENTS 0090775 5/1985 Japan ............................ 346/140 PD

*Primary Examiner*—E. A. Goldberg

*Assistant Examiner*—Huan H. Tran

*Attorney, Agent, or Firm*—Finnegan, Henderson, Farabow, Garrett & Dunner

[57] ABSTRACT

There is provided a method and apparatus for recording an image on a recording member, e.g., a sheet of paper, wherein a liquid coloring agent, e.g., an ink, is arranged in a recording head and electric and thermal energies are applied to the coloring agent to jet out that portion of the coloring agent located in the area to which both energies have been applied. Both energies preferably are simultaneously applied in a pulsatile manner and controlled to apply them to the coloring agent so that droplets of the agent are directed toward the recording member to provide stable, high speed recording.

2 Claims, 7 Drawing Sheets

THERMAL-ELECTROSTATIC INK JET RECORDING METHOD AND APPARATUS

FIELD OF THE INVENTION

This invention relates to a method and apparatus for the non-impact recording of an image by jetting a liquid coloring agent such as ink at a recording member.

BACKGROUND OF THE INVENTION

Non-impact, or ink jet, recording is becoming popular as a method for converting image data in the form of electrical signals into hard copies because it produces less noise during recording than does impact recording.

The ink jet method is also useful because it uses ordinary paper without the need for a special process, such as fixing, for recording purposes.

The ink jet method which has already been put to practical use involves filling an airtight container with ink, applying a pressure pulse to the container, and sending the ink out of the orifice of the container in a jet for recording purposes. The ink jet apparatus in such a method cannot be made compact in view of its operating mechanism. Such apparatus requires mechanical scanning to record at a desired image density, which causes the recording speed to be reduced.

At the same time, there have been proposed techniques for remedying shortcomings in past ink jet printing methods and making high-speed recording possible.

The magnetic ink jet method is a typical example of such improvement, which comprises arranging magnetic ink close to a magnetic electrode array, forming an ink-jet state corresponding in position to a picture element by making use of a swell of the ink in the presence of a magnetic field, and jetting the magnetic ink in the static electric field. Since this method admits of electronic scanning, high-speed recording becomes possible, but it is still disadvantageous in that not only the selection of ink but also coloration characteristic of the ink jet method is difficult.

In addition to the aforesaid method, the so-called plane ink jet method is also well-known. This method involves arranging ink in a slitlike inkholder in parallel to an electrode array, and letting fly the ink in accordance with an electric field pattern formed between an electrode facing the electrode array through recording paper. Since no minute orifice for storing ink is required in this method, ink clogging can be prevented. However, high voltage applied for jetting the ink makes it necessary to drive the electrode array on a time division basis to prevent a voltage leak across the adjoining or neighboring electrodes; the disadvantage is that the recording speed cannot be increased to the extent intended.

There has also been proposed the so-called heat bubble jet method for jetting ink out of an orifice by means of thermal energy. In this method, the ink is abruptly heated to cause film boiling and a pressure rise resulting from the rapid formation of bubbles within the orifice is utilized to jet the ink out thereof. However, the film boiling temperatures are as high as 500°-600° C. and this makes it difficult to put the aforesaid method to practical use because the ink properties tend to be changed by heat, and because the heating resistor protective layer provided as a heating means is deteriorated.

As set forth above, there are remaining problems to be practically solved in any of the ink jet methods heretofore developed, the problems including difficulty in sufficiently increasing recording speed, necessity of employing special ink and contriving a particular driving means, and thermal deterioration of the ink and the heating means.

OBJECT AND SUMMARY OF THE INVENTION

The present invention is intended to solve the above problems, and it is therefore an object of the invention to provide a method and apparatus for recording images at high speed without difficulty in selecting ink for use.

According to the present invention there is provided a method for recording an image comprising the steps of containing a liquid coloring agent and applying both electric and thermal energies to a portion of the agent to jet the agent toward a medium for recording said images. Preferably, both the electric and thermal energies are applied in a pulsatile manner.

Advantageously, the electrical energy is applied to the liquid coloring agent by applying a uniform electric field thereto and the thermal energy is locally applied thereto so as to jet a portion of the agent located in the area to which both the energies have been applied. The electrical and thermal energies preferably are applied simultaneously, and in a pulsatile manner.

In another advantageous embodiment, both the energies are applied to the liquid coloring agent by locally applying the pulselike electric energy to the agent while applying the pulselike thermal energy to the whole agent by uniformly heating all of the agent for a short time. Preferably, both energies are applied simultaneously.

The image recording apparatus according to the present invention comprises container means for containing a liquid coloring agent; thermal energy applying means for heating the liquid coloring agent; electric energy applying means for applying an electric field to the liquid coloring agent; a control means for driving each of the thermal energy applying means and the electric energy applying means to control each of the means in such a manner as to make them, respectively, apply the thermal and electric energies to the liquid coloring agent; and means for positioning a recording member arranged so that the liquid coloring agent caused to be jetted at said recording member as the result of the simultaneous application of the thermal and electric energies thereto.

Preferably, the thermal energy applying means comprises a plurality of heating elements, and the control means is used to drive the electric energy applying means for uniformly applying an electric field to the liquid coloring agent and selectively drive the plurality of heating elements for locally heating the agent, whereby both the electric energy applying means and the heating elements are so controlled in response to an image signal, as to jet out the agent located in the area to which both the energies have been applied.

The electric energy applying means may also comprise a plurality of electric field forming electrodes and the control means is employed to drive the thermal energy applying means for uniformly applying the thermal energy to the liquid coloring agent and selectively drive the plurality of electric field forming electrodes for locally applying the electric field to the agent, whereby both the means are so controlled as to jet out the agent located in the area to which both the energies have been applied.

BRIEF DESCRIPTION OF THE DRAWINGS

The present invention will be fully understood from the detailed description that follows when it is considered with reference to the accompanying drawings wherein.

DETAILED DESCRIPTION

Figure 1A:
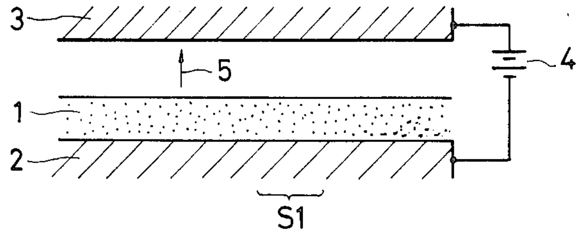
FIGS. 1(*a*), (*b*), (*c*), and (*d*) are schematic diagrams illustrating the principle of an image recording method embodying the present invention.
Figure 1B:
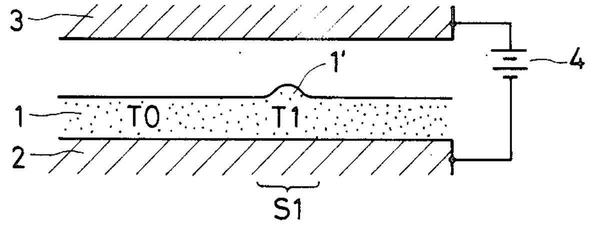
Figure 1C:
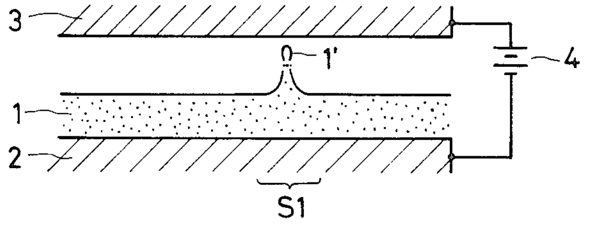
Figure 1D:
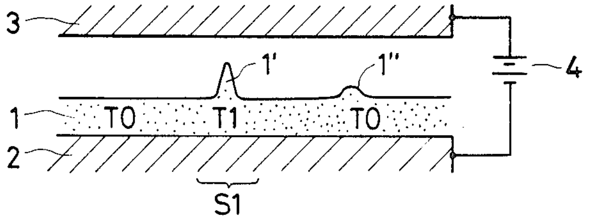

As shown in FIG. 1(*a*), a liquid coloring agent 1 is arranged between a base electrode 2 and an opposite electrode 3. Preferably, the liquid coloring agent comprises ink (hereinafter referred to as simply the "ink 1") capable of bearing proper electrical resistance and being in a liquid state at normal operating temperature. The base electrode 2 and the opposite electrode 3 are both conductive plates.

A d.c. power supply 4 is used to apply voltage across both the electrodes 2, 3. At this time, a fixed static electric field is applied to the ink 1 and, because of its static inductive action, the Coulomb force resulting from the sum of the inductive charge produced thereby and the static electric field acts on the free surface of the ink. Therefore, the ink 1 tends to be jetted in a direction 5 due to that force.

On the other hand, the surface tension, interfacial tension, and viscosity resistance of the ink which is about to be jetted act as a drag thereon. FIG. 1(*a*) shows the state in which the drag is greater than the Coulomb force and the surface of the ink is flat.

The ink 1 is then locally heated; that is, the temperature of an area S1 in FIG. 1(*b*) is raised to T1 which is higher than the temperature, T0, of the remaining ink 1. As shown in FIG. 1(*b*), consequently, the ink level in the area S1 is caused to swell, i.e., a reduction in the drag in the area S1 because of the ink temperature rise allows the action of the Coulomb force to increase locally. The electric field becomes concentrated in the portion of ink denoted as ink 1' and the action of the Coulomb force is further accelerated. Ultimately, part of the ink 1' in the area S1 grows in the form of a column as shown in FIG. 1(*c*) and a droplet will be jetted to the opposite electrode 3. This phenomenon can be brought about rapidly without sharply heating the ink as the surface thereof undergoes a phase change resulting from film boiling.

In other words, thermal as well as electric energies are applied by the electric field and heat to the ink, and the quantities of both the energies thus applied are so selected as to allow the ink in the area to which both the energies have been applied to be jetted out. The electrical and thermal levels at which the ink is caused to jet and the timing of fitting thus become controllable practically.

The aforesaid principle was proven through the following experiments.

The ink 1 was arranged on the base electrode 2 as shown in FIG. 1(*a*) and, while the temperature thereof was kept constant, the voltage of the power supply 4 was gradually raised. When the voltage exceeded a certain level, an ink column 1' shown in FIG. 1(*c*) began to grow randomly toward the opposite electrode 3. This phenomenon is described as the growth of an unstable electrical fluid mechanical wave in "FIELD COUPLED SURFACE WAVE;" pp 61-66, J. R. Melcher (M. I. T. Press).

In other words, the Coulomb force is locally concentrated by the perturbation (local unevenness in the deformation of the liquid level or electric field) naturally produced when the Coulomb force acting in the upward direction perpendicular to the ink liquid level maintains equilibrium against the drag acting in the downward direction. Then the Coulomb force overcomes the drag to allow the ink column to grow.

In the present invention, the electric field was so selected as to be insufficient without heating of the ink to cause an ink column to grow randomly. When the ink was heated in the aforesaid state, the surface tension and viscosity of the ink located in the area thus heated were reduced. As a result, an unstable surface wave was produced even in with the same electric field level to allow the ink column to grow.

The ink that jetted was led to the surface of a recording member such as recording paper so that one dot could be recorded. Moreover, an image could be recorded by arranging the dots methodically.

When the voltage of the power supply was further raised at the time that the ink temperature was increased to T1 in the area S1 to which the thermal energy had been applied the ink column 1' was produced. In addition, there appeared a sign of the growth of an ink column 1" in an area S2 where the ink had not been heated (FIG. 1(*d*)).

Figure 2A:
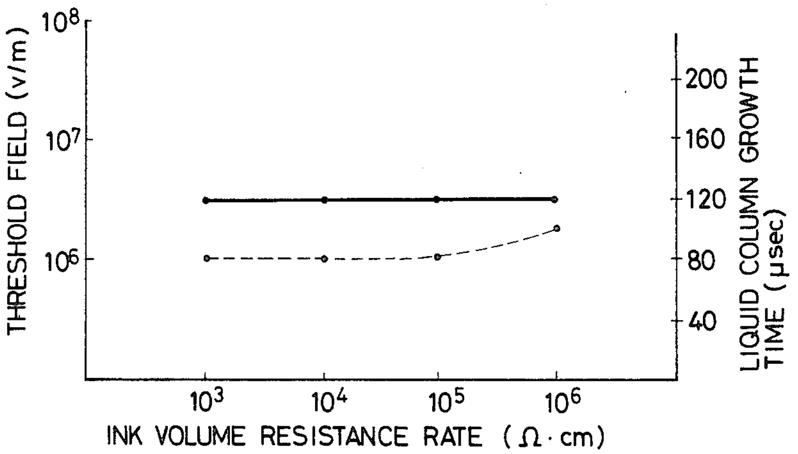
FIGS. 2(*a*), (*b*), and (*c*) are graphs, each showing the relation of the physical properties of ink to a threshold electric field and liquid column growth time.
Figure 2B:
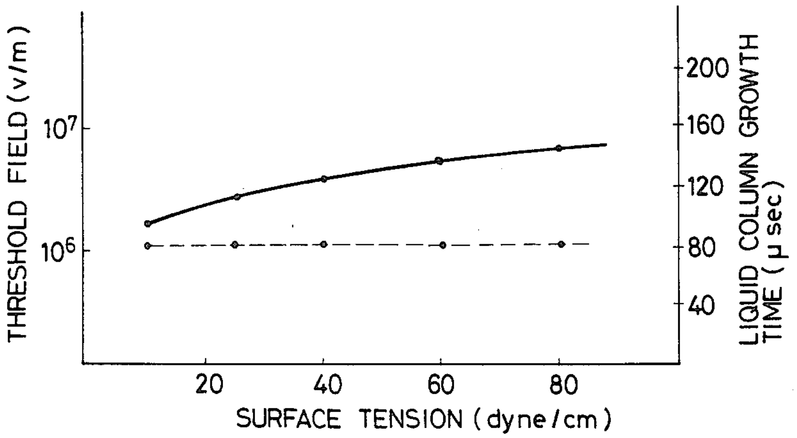
Figure 2C:
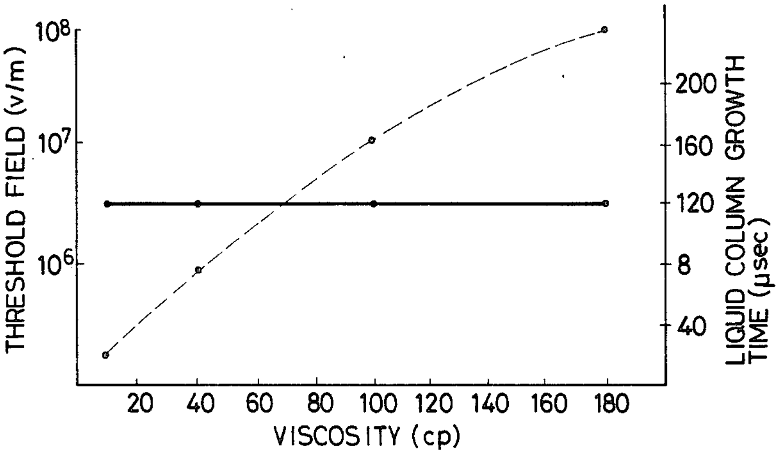

The following experiments were made to examine how the growth of the column from the ink level in the area thus heated relied on the physical properties of the ink. FIG. 2(*a*) is a graph wherein the continuous line shows the value measured in the threshold field volts per meter (v/m) for each kind of ink whose specific volume resistance ranges from $10^3$, $10^4$, $10^5$ to $10^6$ Ohms per centimeter (Ω/cm) at the normal temperature, whereas the dashed line represents the time, in microseconds (μsec), required for the growth of the liquid column.

In the same manner, FIG. 2(*b*) shows the data obtained from the ink whose surface tension varies and FIG. 2(*c*) shows those from the ink whose viscosity (centipoise (cp)), varies. In this case, the time required for the liquid ink column to grow designates the time for the ink to reach the opposite electrode 300 μm apart therefrom. As evident from these graphs, the threshold value decreases as the surface tension or viscosity increases and the time required for the liquid column to grow tends to extend as the specific ink volume resistance increases.

Based on the results obtained from the aforesaid experiments, the generation of the liquid column by means of the thermal energy in cooperation with the electrical energy is considered mainly attributable to the variation in temperature of the ink surface tension in the heated area.

Another factor that causes the liquid level to perturb (or the ink to jet erroneously) is increasing the intensity of the electric field. In consequence, it preferred in the present invention to apply pulsatile thermal energy and electric energy to prevent the aforesaid erroneous flying.

Figures 3A, 3B, 3C:
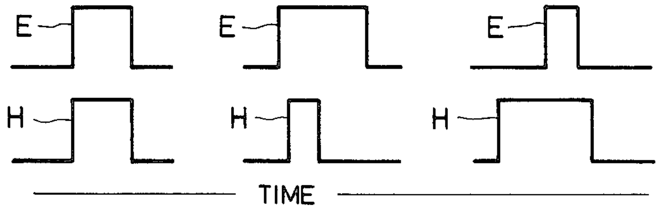
FIGS. 3(*a*), (*b*), (*c*), (*d*), and (*e*) are time charts, each showing an example of timing at which pulsatile electric and thermal energies are applied.
Figures 3D, 3E:
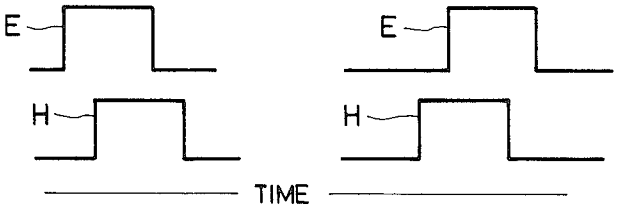

FIGS. 3(*a*)–3(*c*) comprise a series of time charts showing the relative timings at which pulses of electric energy (E) and thermal energy (H) are applied. In the case of FIG. 3(*a*), the electric and thermal energies are applied at the same instant and for the same period of time. In the case of FIGS. 3(*b*) or (*c*), one type of energy is applied for a period shorter than that for the other type of energy. In the case of FIGS. 3(*d*) and (*e*), both the electric and thermal energies are applied for the same time periods but a portion of one period precedes the beginning of the other period.

In any of the aforesaid cases, the liquid coloring agent located in the area to which both the energies have been applied is jetted.

Figure 4:
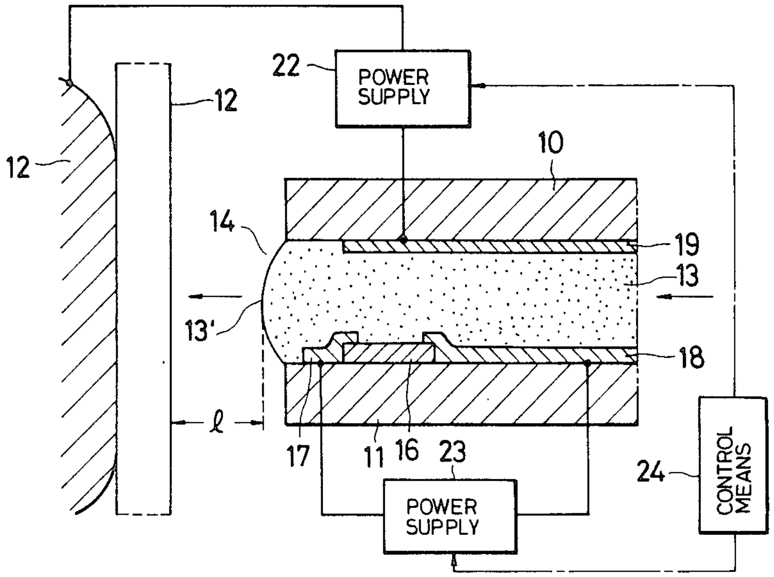
FIG. 4 is a vertical sectional view of a recording head for use in an image recording apparatus embodying the present invention.

FIG. 4 is a transverse sectional view of a recording head and its peripheral portion for an image recording apparatus embodying the present invention. As shown in FIG. 4, a pair of wall members 10, 11 is arranged so that one edge of each member faces a recording member 12. The recording member 12 is a sheet of ordinary recording paper such as that used in a conventional copying machine.

The wall members 10, 11 are arranged a fixed space apart and a liquid coloring agent 13 is placed therebetween. The edges of the wall members 10, 11 set opposite to the recording member 12 form a slit having a width in the direction parallel to the paper surface. The slit portion is called a discharge opening 14. The liquid coloring agent 13 forms a convex face 13' at the discharge opening because of the effects of surface tension.

A number of heating resistors 16 are installed on the inner face of the wall member 11, and are spaced apart and arranged in an array perpendicularly with respect to the paper surface. An electrode 17, common to the heating resistors 16, is connected to one end of each of the resistors 16 and lead electrodes 18 are connected to the other end. Substantially the whole inner face of the wall member 10 is covered with an electric field forming electrode 19.

Figure 5:
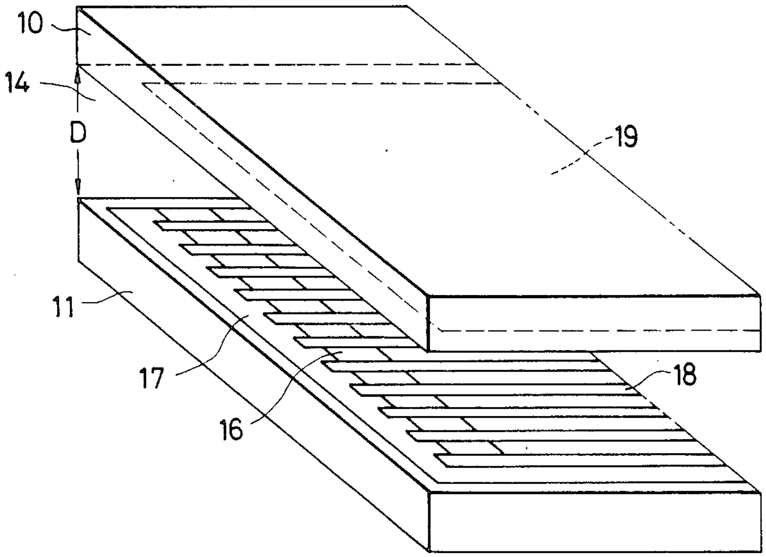
FIG. 5 is a perspective view of a portion of FIG. 4.
Figure 6A:
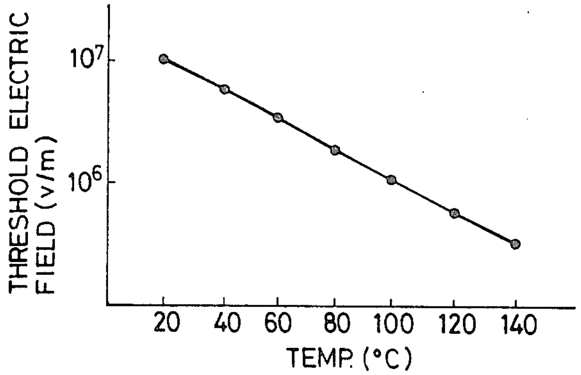
FIGS. 6(*a*), (*b*), (*c*) and (*d*) are graphs showing the reliance of the threshold value of the electric field on the temperature and characteristics of ink.
Figure 6B:
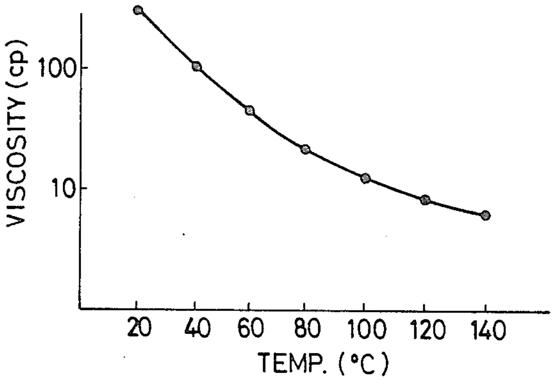
Figure 6C:
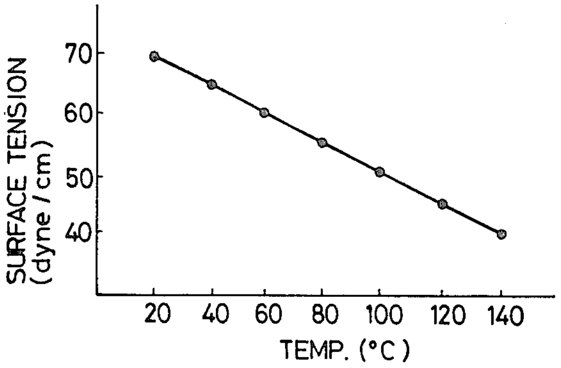
Figure 6D:
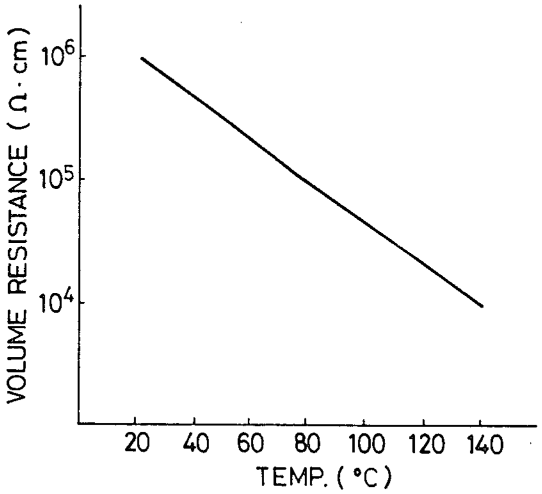

FIG. 5 is a perspective view of the principal portion of the recording head which is described as follows. The parallel heating resistors 16 set in an array should be constructed in the same manner as that in the case of a conventional thermal recording head. The so-called edge type thermal head is an example and it may record with a density of 8 dots/mm on thermal recording paper having a color development temperature of about 90° C. To record on the thermal recording paper, 0.5 W/dot power is supplied to each heating resistor for 1 millisecond (msec). The space D selected between the pair of wall members 10, 11 was set at 100 micrometers (μm).

As shown in FIG. 4 again, the gap between the discharge opening 14 and the recording member 12 was set at 200 μm. Further, an opposite electrode 21 was installed on the rear face of the recording member 12 and a power supply 22 for applying a fixed voltage thereacross was connected to the opposite electrode. The electric field forming electrode 19 was grounded and +1,500 volts (V) was applied to the opposite electrode 21, whereby the electric energy applying means was thus constructed. Also, a power supply 23 was also connected to both the electrodes 17, 18 on both sides of the heating resistors 16, whereby the thermal energy applying means was constructed.

A control means 24 was connected to the power supplies 22, 23 so that the energy was switched on/off in response to the image signal of an image being recorded. The control means 24 was formed with a circuit constituted by a shift register driver such as the type known for driving a thermal head and the like.

As the liquid coloring agent 13 in this example, ink was selected which contained about 15% by weight of carbon-black pigment dispersed in liquid paraffin, with volume resistivity at 20° C. being $1.0\times10^{6}\Omega\cdot$cm, viscosity at 300 cp, and surface tension at 70 dyne/cm.

When the voltage derived from the power source 22 was applied across the electric field forming electrode 19 and the opposite electrode 21 in the recording head thus constructed, the liquid coloring agent located close to the discharge opening 14 was subjected to a uniform electric field.

Current, e.g., 25 milliamperes (mA) at 25 V was selectively supplied to the heating resistors 16 for 1 msec in the aforesaid state.

Only the portion of ink 13 located close to the heating resistor 16 supplied with current was jetted to the recording member 12 and a circular dot about 150 μm in diameter was recorded on the recording surface. Even when the length of time required for supplying power was shortened up to 200 μsec, recording could be made in the same manner.

When the above operation was conducted while no voltage was applied across the electric field forming electrode 19 and the opposite electrode 21, the ink was not jetted.

When the voltage being applied across the electric field forming electrode 19 and the opposite electrode 21 was raised without supplying the current to the heating resistor 16, the ink 13 throughout the discharge opening 14 was seen to jet randomly when the voltage level exceeded 3,000 V.

In tests where current was supplied to the heating resistor 16, ink columns were observed beginning to grow about 100 μsec later than the commencement of supplying power to the heating resistor 16 when the voltage of the current supply 22 was set at 1,500 V. Ink droplets were subsequently jetted to the recording member 12 and it took about 1 msec until the ink level 13' returned to the original state. The subsequent jetting operations must be performed after the ink level 13' returns to the original condition.

When the voltage of the power supply was increased to 2,500 V, on the other hand, the time required for the ink column to start growing was shortened up to about 50 μsec. Notwithstanding, the time required for the ink level 13' to return to the original state remained unchanged. The voltage of the power supply 22 was raised simultaneously with the commencement of supplying power to the heating resistor 16 and cut off about 100 μsec to 1 msec later. The ink was thus prevented from erroneously being jetted even when the power supply voltage was set at 2,500 V and the ink level retutned to the original state within about 200 μsec. In other words, the liquid level was kept stable because it was unaffected by the Coulomb force while no electric energy was applied thereto and the ink was caused to jet stably.

When the stable state of the ink was stimulated by the local application of both the electric and thermal energies, the ink in only the area receiving the energies was caused to jet and, if the application thereof was stopped quickly, the ink did not jet erroneously.

The control means 24 was used to drive the power supplies 22, 23 for a fixed period of time at a fixed timing so that the pulsatile electric and thermal energies might be applied. The timing at which they are applied is, as set forth in FIGS. 3(*a*)-(*e*), selective.

Since the ink is caused to jet by applying the electric and thermal energies to the liquid coloring agent, there exist threshold conditions or values under which it is allowed to be jetted. FIGS. 6(*a*)-(*d*) are graphs showing the results of experiments intended to find the threshold values. According to the data shown in FIG. 6(*a*), the higher the ink temperature, the lower the threshold electric field value becomes. As shown in FIG. 6(*b*), the viscosity of the ink is expressed by a curve but decreases as the ink temperature rises. The same trend is observed in the cases of the surface tension (FIG. 6(*c*)) and specific volume resistance (FIG. 6(*d*)).

As is obvious from the experiments, the aforesaid threshold electric field value is greatly affected by the foregoing factors. In other words, the threshold electric field value decreases as the temperature rises, depending on the composite effect resulting from changes in physical properties including the viscosity, surface tension, and electrical conductivity of the ink.

Accordingly, while an electric field at which the ink is not yet stimulated to jet is given at room temperature, the ink is caused to jet when it is locally heated because of the cooperative action of the heat and the static electric field, so that picture element recording is carried out.

Figure 7:
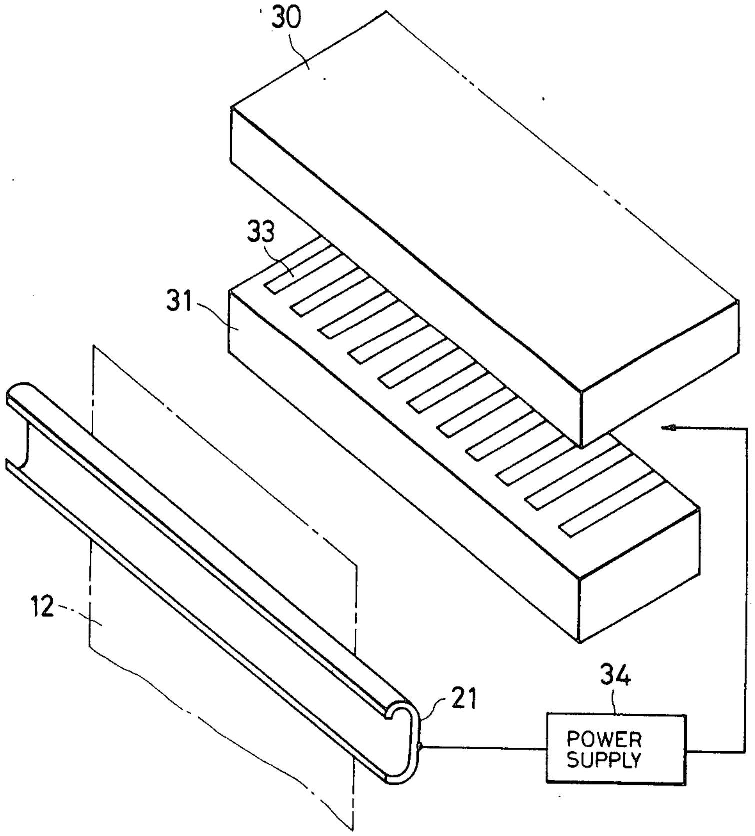
FIG. 7 is a perspective view of a modified recording head suitable for use in the present invention.

FIG. 7 shows the principal portion of an example of the modified recording head according to the present invention wherein a plurality of electric-field forming electrodes 33 are arranged in an array on the inner face of one (e.g. member 31) of the two wall members 30, 31. Ink (not shown) is contained by the wall members 30, 31 and is uniformly heated by a thermal energy applying means (not shown). An opposite electrode 21 is installed on the rear face of a recording member 12 and a power supply 34 is connected between the opposite electrode 21 and the electric field forming electrodes 33. The power supply 34 is used to selectively apply a fixed voltage to the electric field forming electrodes 33. An electric field is thus produced to the extent that it allows the ink to jet from the electric field forming electrode 33 to the opposite electrode 21. Consequently, recording corresponding to image signals can be made on a recording member 12. Recording can be carried out in the same manner by controlling the position to which the electric energy is applied. In this case, the advantage is that the ink is caused to be jetted at a relatively low voltage since the ink is heated.

Figure 8:
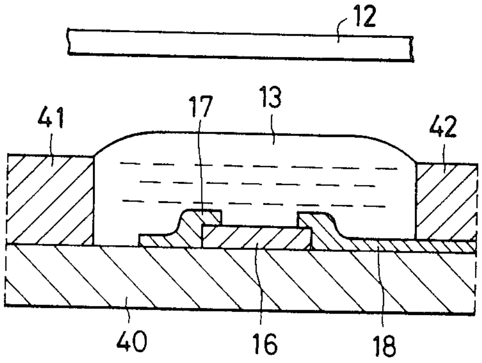
FIG. 8 is a vertical sectional view of another embodiment of the present invention.

FIG. 8 shows the principal portion of another recording apparatus embodying the present invention. In this embodiment, a plurality of heating resistors 16, arranged in an array in the same manner as electrodes 33 of FIG. 7, are installed on a base 40. Ink 13 is supported by transversely installed damlike members 41, 42 above the heating resistors 16. A recording member 12 is arranged above the ink 13 with its recording face turned downward and an electric energy applying means (not shown) is used to form an electric field in the direction perpendicular to the base 40. When current is supplied to the heating resistors 16 in the recording head thus constructed and caused to generate heat, the ink is jetted vertically at the recording member 12 according to the same principle as aforesaid for recording. Such an arrangement is also effective in implementing the present invention.

The present invention is not limited to the specific embodiments of the above-described method and apparatus for recording images. For example, a laser oscillator may be used as a thermal energy applying means. In this case, a laser beam is modulated in accordance with image data to be recorded and directed to the ink so as to selectively heat the ink. Although there has been shown an example wherein either electric or thermal energy applying means is driven at all times, both of them may simultaneously be driven locally for a short period of time during which ink is caused to be jetted.

In the method and apparatus for recording images according to the present invention, temperatures at which the ink and the heating resistors do not undergo extreme thermal deterioration and voltages at which no leakage is caused across the electrodes are employed to let jet the ink for high-speed and high-density recording. In addition, the means for holding the ink may be relatively simple in construction and thus no complicated precise mechanism is needed. Moreover, the thermal energy, as well as the electric energy, required to be applied is relatively small in quantity, so that the size of a driving circuit can be made compact thereby.

What is claimed is:

1. A method for recording images by jetting a liquid coloring agent at a recording medium supported by a backing electrode comprising the steps of:

providing an array of spaced-apart electric resistance heaters;

providing a liquid coloring agent adjacent to said heaters;

applying a uniform electric field to said liquid coloring agent at a level insufficient to cause jetting of said liquid coloring agent at room temperature, said electric field being applied in a pulsatile manner; and applying electric current to selected electric resistance heaters in said array to heat discrete portions of said liquid coloring agent adjacent said selected heaters to a temperature such that liquid coloring agent adjacent said selected heaters and under the influence of said uniform electric field is jetted toward said backing electrode.

2. An image recording apparatus adapted to apply both electric and thermal energies to a liquid agent so as to jet droplets of the liquid coloring agent toward a backing electrode adapted to support a recording medium comprising:

electric energy applying means including an electric field forming electrode spaced from said backing electrode;

a first power supply means for establishing a voltage drop between said electric field forming electrode and said backing electrode so as to apply to liquid coloring agent a uniform, pulsatile electric field having a level less than the level required to jet the liquid coloring agent toward said backing electrode;

thermal energy applying means including a plurality of electric heating resistors for heating liquid coloring agent adjacent thereto; and second power supply means for selectively energizing said heating resistors to raise the temperature of the liquid coloring agent adjacent the energized heating resistors under the influence of said uniform electric field so as to jet droplets of said liquid coloring agent from the area of the energized heating resistors toward said backing electrode.

* * * * *